United States Patent
Zhang et al.

(10) Patent No.: US 11,387,936 B2
(45) Date of Patent: Jul. 12, 2022

(54) HYBRID AUTOMATIC REPEAT REQUEST (HARQ) RETRANSMISSION SCHEMES FOR A WIRELESS LOCAL AREA NETWORK (WLAN)

(71) Applicant: NXP USA, Inc., Austin, TX (US)

(72) Inventors: Yan Zhang, Palo Alto, CA (US); Hongyuan Zhang, Fremont, CA (US); Rui Cao, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 76 days.

(21) Appl. No.: 16/714,366

(22) Filed: Dec. 13, 2019

(65) Prior Publication Data
US 2020/0195376 A1 Jun. 18, 2020

Related U.S. Application Data

(60) Provisional application No. 62/780,082, filed on Dec. 14, 2018.

(51) Int. Cl.
*H04L 1/00* (2006.01)
*H04L 1/18* (2006.01)

(52) U.S. Cl.
CPC ......... *H04L 1/0046* (2013.01); *H04L 1/0057* (2013.01); *H04L 1/1812* (2013.01)

(58) Field of Classification Search
CPC ... H04L 1/0046; H04L 1/0057; H04L 1/1812; H04L 1/1819; H04L 1/0041;
(Continued)

(56) References Cited

U.S. PATENT DOCUMENTS 6,718,497 B1  4/2004 Whitby-Strevens
7,054,296 B1  5/2006 Sorrells et al.
(Continued)

FOREIGN PATENT DOCUMENTS

WO  WO-2021006809 A1 * 1/2021

OTHER PUBLICATIONS

IEEE Std 802.11-REVmc™/D8.0 (revision of IEEE Std. 802.11TM-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).
(Continued)

Primary Examiner — Huy D Vu
Assistant Examiner — Robert Ma

(57) ABSTRACT

A first communication device encodes, according to a non-rate-matching coding scheme, a set information bits to generate a set of coded bits, generates a first physical layer (PHY) data unit to include at least some of the coded bits, and transmits the first PHY data unit in an initial hybrid automatic repeat request (HARQ) transmission to a second communication device. Subsequently, in response to determining that the second communication device was not able to properly decode the set of coded bits based on the initial HARQ transmission, the first communication device selects a subset of the set of coded bits, the subset including some, but not all, coded bits that were included in the initial HARQ transmission, generates a second PHY data unit to include the subset of coded bits, and transmits the second PHY data unit in a HARQ retransmission to the second communication device.

26 Claims, 5 Drawing Sheets

(58) Field of Classification Search
CPC . H04L 1/0007; H04L 27/2607; H04L 1/1893; H04J 11/0026; H03M 13/3707
See application file for complete search history.

(56) References Cited

U.S. PATENT DOCUMENTS

| | | | |
|---|---|---|---|
| 8,175,015 | B1 | 5/2012 | Chowdhuri et al. |
| 8,599,803 | B1 | 12/2013 | Zhang et al. |
| 9,319,174 | B2 | 4/2016 | Merlin et al. |
| 9,351,333 | B1 | 5/2016 | Zhang et al. |
| 9,369,240 | B2 | 6/2016 | Pirskanen et al. |
| 9,876,614 | B1 * | 1/2018 | Sun .............. H04L 27/2607 |
| 10,135,582 | B1 | 11/2018 | Sun et al. |
| 2005/0180315 | A1 | 8/2005 | Chitrapu et al. |
| 2006/0050742 | A1 | 3/2006 | Grandhi et al. |
| 2007/0186134 | A1 | 8/2007 | Singh et al. |
| 2007/0245205 | A1 | 10/2007 | Popovski et al. |
| 2008/0165670 | A1 | 7/2008 | Tao et al. |
| 2009/0031185 | A1 | 1/2009 | Xhafa et al. |
| 2009/0074088 | A1 | 3/2009 | Tao et al. |
| 2009/0219851 | A1 | 9/2009 | Abraham et al. |
| 2009/0219870 | A1 | 9/2009 | Wengerter et al. |
| 2009/0259915 | A1 | 10/2009 | Livshitz et al. |
| 2010/0054189 | A1 | 3/2010 | Chang et al. |
| 2010/0238818 | A1 * | 9/2010 | Takaoka .............. H04J 11/0026 370/252 |
| 2011/0038332 | A1 | 2/2011 | Liu et al. |
| 2011/0134816 | A1 | 6/2011 | Liu et al. |
| 2011/0199971 | A1 | 8/2011 | Kim et al. |
| 2011/0305176 | A1 | 12/2011 | Wentink |
| 2012/0051342 | A1 | 3/2012 | Liu et al. |
| 2012/0140753 | A1 | 6/2012 | Lee et al. |
| 2013/0229996 | A1 | 9/2013 | Wang et al. |
| 2013/0235860 | A1 | 9/2013 | Vermani et al. |
| 2013/0315139 | A1 | 11/2013 | Abraham et al. |
| 2014/0079016 | A1 | 3/2014 | Dai et al. |
| 2014/0126580 | A1 | 5/2014 | Sampath et al. |
| 2014/0185695 | A1 | 7/2014 | Kenney et al. |
| 2014/0293868 | A1 | 10/2014 | Levanen et al. |
| 2015/0049677 | A1 | 2/2015 | Lin et al. |
| 2015/0063233 | A1 | 3/2015 | Choi et al. |
| 2016/0197705 | A1 | 7/2016 | Ryu et al. |
| 2016/0380727 | A1 | 12/2016 | Ryu et al. |
| 2017/0085354 | A1 * | 3/2017 | Kudekar .............. H04L 1/1893 |
| 2017/0230149 | A1 | 8/2017 | Wang et al. |
| 2017/0311204 | A1 | 10/2017 | Cariou et al. |
| 2018/0102929 | A1 | 4/2018 | Lin et al. |
| 2018/0131391 | A1 * | 5/2018 | Kudekar ........... H03M 13/3707 |
| 2018/0302256 | A1 | 10/2018 | Huang et al. |
| 2020/0083983 | A1 * | 3/2020 | Chen .............. H04L 1/0041 |

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency Wlan," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

* cited by examiner

HYBRID AUTOMATIC REPEAT REQUEST (HARQ) RETRANSMISSION SCHEMES FOR A WIRELESS LOCAL AREA NETWORK (WLAN)

CROSS REFERENCE TO RELATED APPLICATIONS

This application claims the benefit of U.S. Provisional Patent Application No. 62/780,082, entitled "Hybrid ARQ (HARQ) Retransmission Schemes for High Throughput in WLAN," filed on Dec. 14, 2018, which is incorporated herein by reference in its entirety.

FIELD OF TECHNOLOGY

The present disclosure relates generally to wireless communication systems, and more particularly to hybrid automatic repeat request (HARQ) retransmission schemes.

BACKGROUND

Hybrid automatic repeat request (HARQ) is a technique for improving throughput in communication systems. With HARQ, when a receiver is not able to decode a received communication frame, the receiver stores the transmission in a buffer. Then, a transmitter retransmits the communication frame and the receiver decodes the communication frame using both the initial transmission stored in the buffer and the retransmission, e.g., using "soft combining" techniques.

One example of a HARQ technique is referred to as "chase combining." In chase combining, the transmitter retransmits the same identical communication frame one or more times, and the receiver "soft combines" the initial transmission and the one or more retransmissions to decode the communication frame.

Another example of a HARQ technique is referred to as "incremental redundancy." In incremental redundancy, the initial transmission omits some bits (e.g., "puncturing" is used) from an encoded frame, and each retransmission omits different bits and includes some bits that were not included in the previous transmissions. Thus, with each retransmission, the receiver incrementally receives additional information that was not previously transmitted. The receiver then "soft combines" the initial transmission and the one or more retransmissions to decode the communication frame.

Incremental redundancy HARQ is typically implemented in systems that encode frames using rate-matching codes. With a rate-matching code, a bit stream in encoded using an error correcting code to generate a coded bit stream at a base coding rate and one or more bits are then punctured from the coded bit stream, which effectively increases the coding rate. A desired coding rate for an initial HARQ transmission is therefore achieved by puncturing a certain number of bits from the coded bit stream at the base coding rate. Then, if an HARQ retransmission is needed for decoding the bit stream at the receiver, one or more of the bits that were punctured and not transmitted in the initial HARQ transmission are transmitted in the HARQ retransmission, thereby providing incremental redundancy for decoding the bit stream at the receiver.

SUMMARY

In an embodiment, a method for communicating a method for communicating according to a hybrid automatic repeat request (HARQ) process in a wireless local area network (WLAN) includes: encoding, at a first communication device according to a non-rate-matching coding scheme at a particular coding rate, a set information to generate a set of coded bits, the non-rate-matching coding scheme defining different information block lengths, for a set of codeword block lengths, to be used for generating coded bit streams at different ones of multiple coding rates; transmitting, by the first communication device, the first PHY data unit in an initial hybrid automatic repeat request (HARQ) transmission via a communication channel to a second communication device; determining, at the first communication device, that the second communication device was not able to properly decode the set of coded bits based on the initial HARQ transmission; in response to determining that the second communication device was not able to properly decode the set of coded bits based on the initial HARQ transmission, selecting, at the first communication device, a first subset of the set of coded bits, the first subset of the set of coded bits including some, but not all, coded bits that were included in the initial HARQ transmission, and generating, at the first communication device, a second PHY data unit to i) include the coded bits selected for the first subset of the set of coded bits and ii) exclude coded bits, of the set of coded bits, not selected for the first subset of the set of coded bits; and transmitting, by the first communication device, the second PHY data unit in a HARQ retransmission via the communication channel to the second communication device to provide incremental redundancy for decoding the set of coded bits at the second communication device.

In another embodiment, a wireless communication device comprises a network interface device associated with a first communication device, wherein the network interface device is implemented on one or more integrated circuit (IC) devices, and wherein the one or more IC devices are configured to: encode, according to a non-rate-matching coding scheme at an initial coding rate, a set information to generate a set of coded bits, the non-rate-matching coding scheme defining different information block lengths, for a set of codeword block lengths, to be used for generating coded bit streams at different ones of multiple coding rates; transmit the first PHY data unit in an initial hybrid automatic repeat request (HARQ) transmission via a communication channel to a second communication device; determine that the second communication device was not able to properly decode the set of coded bits based on the initial HARQ transmission; in response to determining that the second communication device was not able to properly decode the set of coded bits based on the initial HARQ transmission, select a first subset of the set of coded bits, the first subset of the set of coded bits including some, but not all, coded bits that were included in the initial HARQ transmission, and generate a second PHY data unit to i) include the coded bits selected for the first subset of the set of coded bits and ii) exclude coded bits, of the set of coded bits, not selected for the first subset of the set of coded bits; and transmit the second PHY data unit in a HARQ retransmission via the communication channel to the second communication device to provide incremental redundancy for decoding the set of coded bits at the second communication device.

DETAILED DESCRIPTION

Figure 1:
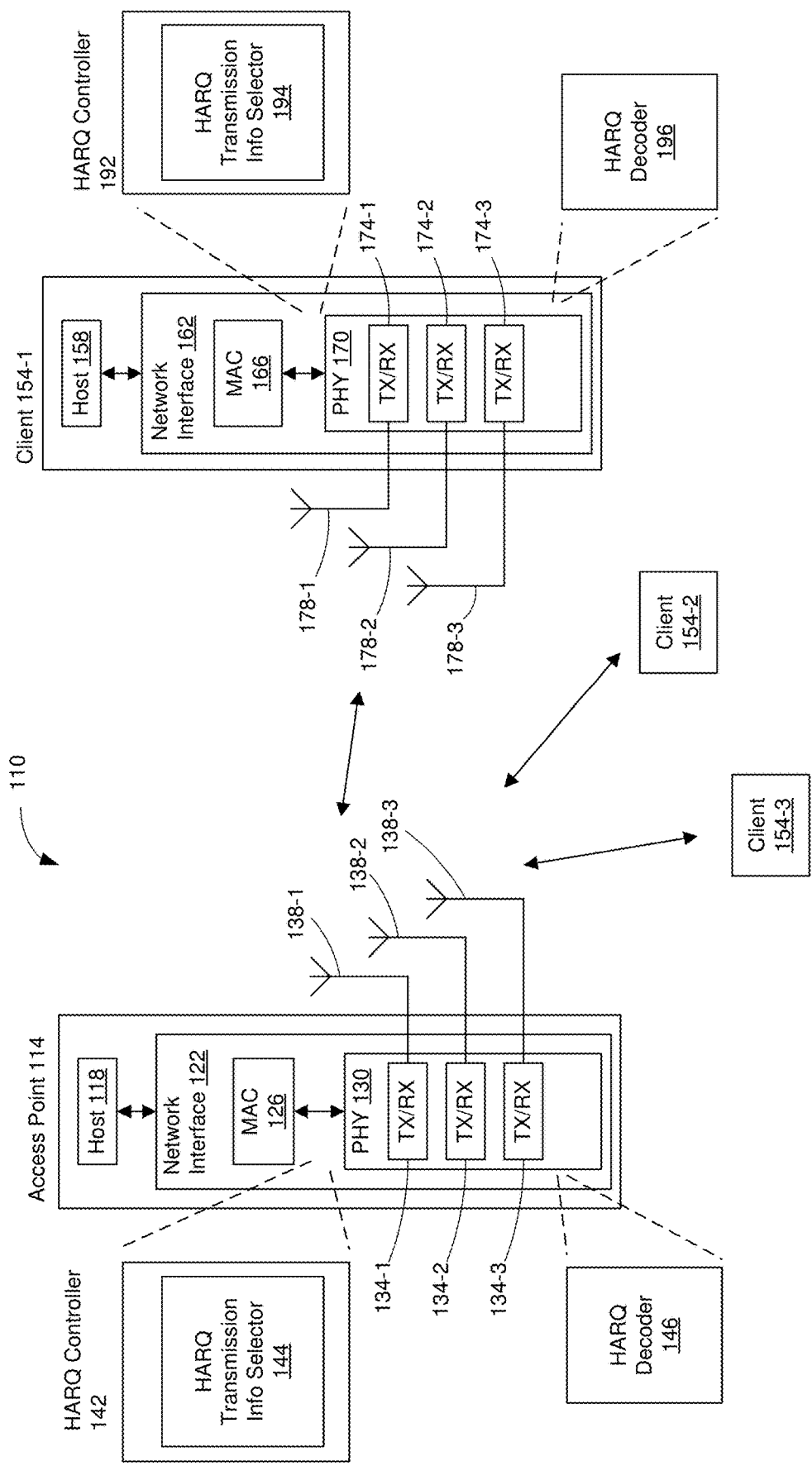
FIG. 1 is a block diagram of an example wireless local area network (WLAN) in which communication devices exchange physical layer (PHY) data units according to a hybrid automatic repeat request (HARQ) process, according to an embodiment.

In embodiments described below, a first communication device, such as an access point (AP) in a wireless local area network (WLAN), generates a coded information stream (also sometimes referred to herein as "coded bit stream") and transmits at least a portion of the coded information stream in an initial hybrid automatic repeat request (HARQ) transmission to a second communication device, such as a client station in the WLAN. Subsequently, if the first communication device determines that the second communication device was not able to properly decode the coded information stream based on the initial HARQ transmission, the first communication device provides, in one or more incremental redundancy (IR) HARQ retransmissions to the second communication device to the second communication device, incremental redundancy information that can be used for decoding the coded information stream at the second communication device. The second communication device then "soft combines" the at least the portion of the coded information stream in the initial HARQ transmission and the coded redundancy information stream in the one or more IR HARQ retransmissions to decode the coded information stream, in an embodiment.

In prior art devices that utilize IR HARQ, a rate-matching coding scheme, such as a rate-matching turbo coding scheme, is typically used to encode an information stream for an initial HARQ transmission. According to a rate-matching coding scheme, a common base coding rate is utilized across multiple coding rates supported by the coding scheme. An information stream is encoded to generate a base-coded bit stream at the common base coding rate, and one or more coded bits are then punctured from the base-coded bit stream to generate a coded bit stream at a desired one of the multiple coding rates. Then, an IR HARQ retransmission is generated to include at least some of the bits that were punctured from the base-coded bit stream in the initial HARQ transmission, in an embodiment.

In embodiments described herein, a non-rate-matching coding scheme is used to encode an information stream for an initial HARQ transmission, in at least some situations. The non-rate-matching coding scheme does not use a common base code for multiple coding rates supported by the coding scheme, in an embodiment. Rather, the non-rate-matching coding scheme defines a different code (e.g., a different parity matrix) for each of the multiple coding rates supported by the coding scheme, in an embodiment. In an embodiment, when the non-rate-matching coding scheme is used to generate a coded information stream for an initial HARQ transmission, the first communication device selects a subset of the coded information stream for a HARQ retransmission. In an embodiment, the subset of the coded information stream selected at the first communication device for a HARQ retransmission includes some, but not all, coded bits (e.g., information and/or parity bits) that were included in the initial HARQ transmission. The second communication device "soft combines" the at least a coded bit stream included in the initial HARQ transmission and selected subsets of the coded bit stream included in one or more HARQ retransmissions to decode the coded bit stream. Such HARQ schemes described herein allow communication devices to utilize incremental redundancy HARQ retransmissions when non-rate-matching coding schemes are utilized. For example, in some embodiment, the HARQ schemes described herein allow communication devices to utilize incremental redundancy HARQ retransmissions when non-rate-matching coding schemes defined by current WLAN communication protocols are utilized, without modifying the non-rate-matching coding schemes defined by the current WLAN communication protocols.

FIG. 1 is a block diagram of an example WLAN 110, according to an embodiment. The WLAN 110 includes an access point (AP) 114 that is configured to transmit and receive HARQ transmissions. The AP 114 comprises a host processor 118 coupled to a network interface device 122. The network interface 122 includes a media access control (MAC) layer processor 126 (referred to as a "MAC processor") and a PHY processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MPDUs, A-MPDUs, etc., and provide the MAC layer data units to the PHY processor 130.

In an embodiment, the MAC processor 126 includes a padding unit that is configured to determine a number of padding bits to be added to an MPDU, and to add the determined number of padding bits to the MPDU. In an embodiment, the padding unit comprises a logic circuit that is configured to determine the number of padding bits to be added to the MPDU, and/or to add the determined number of padding bits to the MPDU. In an embodiment, the padding unit is implemented at least partially by a processor of the MAC processor 126, wherein the processor executes machine readable instructions that, when executed by the processor, cause the processor to determine the number of padding bits to be added to the MPDU, and/or to add the determined number of padding bits to the MPDU, and/or control a logic circuit of the MAC processor 126 to add the determined number of padding bits to the MPDU.

The PHY processor 130 is configured to receive MAC layer data units from the MAC processor 126 and encapsulate the MAC layer data units to generate PHY data units such as PHY protocol data units (PPDUs), PHY protocol service data units (PSDUs), etc., for transmission via the antennas 138. Similarly, the PHY processor 130 is configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In an embodiment, the PHY processor 130 includes one or more forward error correction (FEC) encoders that are configured to encode bits in a MAC layer data unit according to one or more FEC coding schemes. For example, the PHY processor 130 includes a binary convolutional code (BCC) encoder followed by a puncturing device, according to an embodiment. As another example, the PHY processor 130 additionally or alternatively includes a low-density parity check (LDPC) encoder, according to another embodiment. In an embodiment, the FEC encoder comprises a logic circuit that is configured to encode bits in a MAC layer data unit according to an FEC coding scheme. In an embodiment, the FEC encoder is implemented at least partially by a processor of the PHY processor 130, wherein the processor executes machine readable instructions that, when executed by the processor, cause the processor to encode bits in a MAC layer data unit according to an FEC coding scheme.

Similarly, in an embodiment, the PHY processor 130 includes one or more FEC decoders that are configured to decode bits in a PHY data unit according to one or more FEC coding schemes. For example, the PHY processor 130 includes a BCC decoder, according to an embodiment. As another example, the PHY processor 130 additionally or alternatively includes an LDPC decoder, according to another embodiment. In an embodiment, the FEC decoder comprises a logic circuit that is configured to decode bits in a PHY data unit according to an FEC coding scheme. In an embodiment, the FEC decoder is implemented at least partially by a processor of the PHY processor 130, wherein the processor executes machine readable instructions that, when executed by the processor, cause the processor to decode bits in a PHY data unit according to an FEC coding scheme.

In an embodiment, the PHY processor 130 includes a padding unit that is configured to determine a number of padding bits to be added to a PHY data unit, and to add the determined number of padding bits to the PHY data unit. In an embodiment, some padding bits are added to the PHY data unit prior to the PHY processor 130 performing FEC encoding of the PHY data unit, and some padding bits are added to the PHY data unit after the PHY processor 130 performs FEC encoding of the PHY data unit. Accordingly, the padding unit is configured to determine a first number of padding bits to be added to a PHY data unit prior to performing FEC encoding of the PHY data unit, and to determine a second number of padding bits to be added to the PHY data unit after performing FEC encoding of the PHY data unit, in an embodiment.

In an embodiment, the padding unit comprises a logic circuit that is configured to determine the number of padding bits to be added to the PHY data unit, and/or to add the determined number of padding bits to the PHY data unit. In an embodiment, the padding unit is implemented at least partially by a processor of the PHY processor 130, wherein the processor executes machine readable instructions that, when executed by the processor, cause the processor to determine the number of padding bits to be added to the PHY data unit, and/or to add the determined number of padding bits to the PHY data unit, and/or control a logic circuit of the PHY processor 130 to add the determined number of padding bits to the PHY data unit.

In various embodiments, the MAC processor 126 is configured to generate and process MAC layer data units such as described herein. In various embodiments, the PHY processor 130 is configured to generate and process PHY data units such as described herein.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine that is configured to perform MAC layer functions, control the PHY processor 130, etc.

In an embodiment, the network interface 122 includes a HARQ controller 142 that is configured to control the network interface 122 to generate HARQ transmissions. In an embodiment, the MAC processor 126 includes at least a portion of the HARQ controller 142. In an embodiment, the PHY processor 130 includes at least a portion of the HARQ controller 142. In an embodiment, the HARQ controller 142 includes a HARQ transmission information selector 144 that is configured to select information to be included in each HARQ transmission as described herein. For example, the HARQ transmission information selector 144 is configured to select a subset of information bits and/or a subset of parity bits of a coded information stream, generated for an initial HARQ transmission, to be included in a HARQ retransmission as described herein, according to an embodiment.

In an embodiment, the HARQ controller 142 is implemented by a processor configured to execute machine readable instructions stored in a memory device (not shown) such as a RAM, a ROM, a flash memory, etc. In an embodiment, the HARQ controller 142 additionally or alternatively includes a hardware state machine that is configured to generate HARQ transmissions such as described herein. Similarly, the HARQ transmission information selector 144 is implemented by a processor configured to execute machine readable instructions stored in a memory device (not shown) such as a RAM, a ROM, a flash memory, etc. In an embodiment, the HARQ transmission information selector 144 additionally or alternatively includes a hardware state machine that is configured to select information to be included in each HARQ retransmission as described herein.

In an embodiment, the network interface 122 also includes a HARQ decoder 146. In an embodiment, the PHY processor 130 includes at least a portion of the HARQ decoder 146. The HARQ decoder 146 is configured to decode a HARQ transmission by "soft combining" information included in an initial HARQ transmission and information included in one or more HARQ retransmissions. The HARQ decoder 146 is configured to use HARQ-related signaling information included in a HARQ retransmission to identify information that was selected to be included in the HARQ retransmission so that the selected information can be properly combined with the information obtained from the initial HARQ transmission, in an embodiment.

In an embodiment, the HARQ decoder 146 is implemented by a processor configured to execute machine readable instructions stored in a memory device (not shown) such as a RAM, a ROM, a flash memory, etc. In an embodiment, the HARQ decoder 146 additionally or alternatively includes a hardware state machine that is configured to decode a HARQ transmission by properly combining information included in an initial HARQ transmission and information included in one or more HARQ retransmissions.

The WLAN 110 includes a plurality of client stations 154 that are configured to transmit and receive HARQ PPDUs. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, A-MPDUs, etc., and provide the MAC layer data units to the PHY processor 170.

In an embodiment, the MAC processor 166 includes a padding unit that is configured to determine a number of padding bits to be added to an MPDU, and to add the determined number of padding bits to the MPDU. In an embodiment, the padding unit comprises a logic circuit that is configured to determine the number of padding bits to be added to the MPDU, and/or to add the determined number of padding bits to the MPDU. In an embodiment, the padding unit is implemented at least partially by a processor of the MAC processor 166, wherein the processor executes machine readable instructions that, when executed by the processor, cause the processor to determine the number of padding bits to be added to the MPDU, and/or to add the determined number of padding bits to the MPDU, and/or control a logic circuit of the MAC processor 166 to add the determined number of padding bits to the MPDU.

The PHY processor 170 is configured to receive MAC layer data units from the MAC processor 166 and encapsulate the MAC layer data units to generate PHY data units such as PPDUs, PSDUs, etc., for transmission via the antennas 178. Similarly, the PHY processor 170 is configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

In an embodiment, the PHY processor 170 includes one or more FEC encoders that are configured to encode bits in a MAC layer data unit according to one or more FEC coding schemes. For example, the PHY processor 170 includes a BCC encoder followed by a puncturing device, according to an embodiment. As another example, the PHY processor 170 additionally or alternatively includes an LDPC encoder, according to another embodiment. In an embodiment, the FEC encoder comprises a logic circuit that is configured to encode bits in a MAC layer data unit according to an FEC coding scheme. In an embodiment, the FEC encoder is implemented at least partially by a processor of the PHY processor 170, wherein the processor executes machine readable instructions that, when executed by the processor, cause the processor to encode bits in a MAC layer data unit according to an FEC coding scheme.

Similarly, in an embodiment, the PHY processor 170 includes one or more FEC decoders that are configured to decode bits in a PHY data unit according to one or more FEC coding schemes. For example, the PHY processor 170 includes a BCC decoder, according to an embodiment. As another example, the PHY processor 130 additionally or alternatively includes an LDPC decoder, according to another embodiment. In an embodiment, the FEC decoder comprises a logic circuit that is configured to decode bits in a PHY data unit according to an FEC coding scheme. In an embodiment, the FEC decoder is implemented at least partially by a processor of the PHY processor 170, wherein the processor executes machine readable instructions that, when executed by the processor, cause the processor to decode bits in a PHY data unit according to an FEC coding scheme.

In an embodiment, the PHY processor 170 includes a padding unit that is configured to determine a number of padding bits to be added to a PHY data unit, and to add the determined number of padding bits to the PHY data unit. In an embodiment, some padding bits are added to the PHY data unit prior to the PHY processor 170 performing FEC encoding of the PHY data unit, and some padding bits are added to the PHY data unit after the PHY processor 170 performs FEC encoding of the PHY data unit. Accordingly, the padding unit is configured to determine a first number of padding bits to be added to a PHY data unit prior to performing FEC encoding of the PHY data unit, and to determine a second number of padding bits to be added to the PHY data unit after performing FEC encoding of the PHY data unit, in an embodiment.

In an embodiment, the padding unit comprises a logic circuit that is configured to determine the number of padding bits to be added to the PHY data unit, and/or to add the determined number of padding bits to the PHY data unit. In an embodiment, the padding unit is implemented at least partially by a processor of the PHY processor 170, wherein the processor executes machine readable instructions that, when executed by the processor, cause the processor to determine the number of padding bits to be added to the PHY data unit, and/or to add the determined number of padding bits to the PHY data unit, and/or control a logic circuit of the PHY processor 170 to add the determined number of padding bits to the PHY data unit.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine that is configured to perform MAC layer functions, control the PHY processor 170, etc.

In an embodiment, the network interface 162 includes a HARQ controller 192 that is configured to control the network interface 162 to generate HARQ transmissions. In an embodiment, the MAC processor 166 includes at least a portion of the HARQ controller 192. In an embodiment, the PHY processor 170 includes at least a portion of the HARQ controller 192. In an embodiment, the HARQ controller 192 includes a HARQ transmission information selector 194 that is configured to select information to be included in each HARQ transmission as described herein. For example, the HARQ transmission information selector 194 is configured to select a subset of information bits and/or a subset of parity bits of a coded information stream, generated for an initial HARQ transmission, to be included in a HARQ retransmission as described herein, according to an embodiment.

In an embodiment, the HARQ controller 192 is implemented by a processor configured to execute machine readable instructions stored in a memory device (not shown) such as a RAM, a ROM, a flash memory, etc. In an embodiment, the HARQ controller 192 additionally or alternatively includes a hardware state machine that is configured to generate HARQ transmissions such as described herein. Similarly, the HARQ transmission information selector 194 is implemented by a processor configured to execute machine readable instructions stored in a memory device (not shown) such as a RAM, a ROM, a flash memory, etc. In an embodiment, the HARQ transmission information selector 194 additionally or alternatively includes a hardware state machine that is configured to select information to be included in each HARQ retransmission as described herein.

In an embodiment, the network interface 162 also includes a HARQ decoder 196. In an embodiment, the PHY processor 170 includes at least a portion of the HARQ decoder 196. The HARQ decoder 196 is configured to decode a HARQ transmission by "soft combining" information included in an initial HARQ transmission and information included in one or more HARQ retransmissions. The HARQ decoder 196 is configured to use HARQ-related signaling information included in a HARQ retransmission to identify information that was selected to be included in the HARQ retransmission so that the selected information can be properly combined with the information obtained from the initial HARQ transmission, in an embodiment.

In an embodiment, the HARQ decoder 196 is implemented by a processor configured to execute machine readable instructions stored in a memory device (not shown)

such as a RAM, a ROM, a flash memory, etc. In an embodiment, the HARQ decoder 196 additionally or alternatively includes a hardware state machine that is configured to decode a HARQ transmission by properly combining information included in an initial HARQ transmission and information included in one or more HARQ retransmissions.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
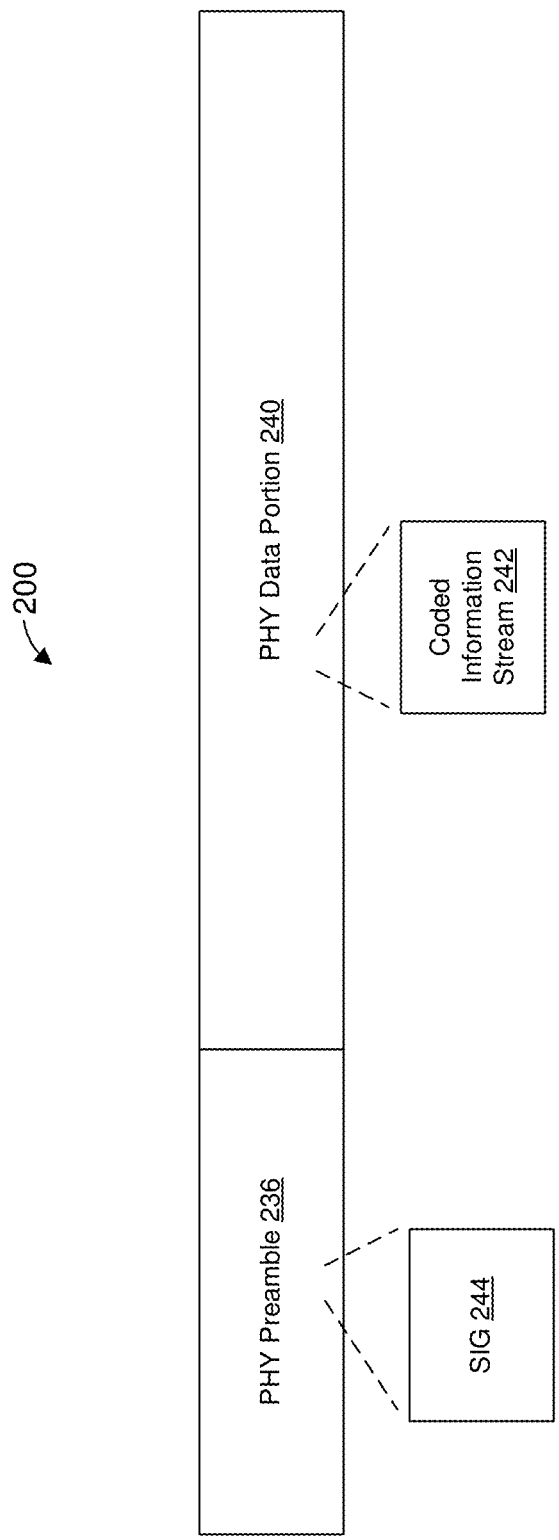
FIG. 2 is a diagram of an example PHY data unit transmitted during a HARQ session in the WLAN of FIG. 1, according to an embodiment.

FIG. 2 is a diagram of an example PPDU 200 for transmission in a HARQ process, according to an embodiment. The network interface 122 is configured to generate the PPDU 200, according to an embodiment. Similarly, the network interface 162 is configured to generate the PPDU 200, according to an embodiment. In other embodiments, another suitable WLAN network interface generates the PPDU 200.

In an embodiment, the PPDU 200 is generated for an initial HARQ transmission in the HARQ process. In another embodiment, the PPDU 200 is generated for a HARQ retransmission on the HARQ process. For example, a first communication device (e.g., the AP 114) generates an initial data unit, such as the PPDU 200, to include at least a portion of a coded bit stream for an initial HARQ transmission to a second communication device (e.g., the client station 154-1). Subsequently, the first communication device generates one or more additional data units, such as one or more additional PPDUs 200, to include redundancy information for one or more HARQ retransmissions to the second communication device. For example, when IR HARQ is being utilized, the first communication device generates the one or more additional PPDUs 200 to include additional redundancy information that was not included in the initial HARQ transmission and/or one or more portions of the coded data stream that was included in the initial HARQ transmission. The second communication device "soft combines" the information in the initial HARQ transmission and the one or more HARQ retransmissions to decode the coded data stream, in an embodiment.

The PPDU 200 includes a PHY preamble 236 and a PHY data portion 240. The PHY preamble 236 includes training signals (not shown) for performing one or more of packet detection, synchronization, automatic gain control (AGC) adjustment, channel estimation, etc. Additionally, the PHY preamble 236 includes one or more signal (SIG) fields 244 (sometimes referred to herein as "SIG field 244") that include indications of PHY parameters corresponding to the PHY data portion 240 and which the second communication device uses to demodulate and decode the PHY data portion 240. Examples of PHY parameters indicated by the one or more SIG fields include one or more of a modulation and coding scheme (MCS) applied to the PHY data portion 240 by a transmitter, a duration of the PHY data portion 240, a type of FEC encoding employed, etc. In an embodiment in which different types of HARQ can be used (e.g., chase combining (CC), incremental redundancy (IR), etc.), one or more bits of the SIG field 244 are used to indicate the type of HARQ used for the PPDU 204.

The PHY data portion 240 includes a coded information stream 242, in an embodiment. The coded information stream 242 is included in the PHY data portion 240 when the PPDU 200 is generated for an initial HARQ transmission, in an embodiment. The coded information stream 242 is not included in the PHY data portion 240 when the PPDU 200 is generated for a HARQ retransmission, for example when IR HARQ is being utilized, in an embodiment. In an embodiment, the coded information stream 242 corresponds to, or is included in, an MPDU in the PHY data portion 240. In another embodiment, the coded information stream 242 spans multiple MPDUs included in the PHY data portion 240. In an embodiment and/or scenario, the coded information stream 242 is generated according to a rate-matching coding scheme that defines a common base coding rate across multiple coding rates supported by the rate-matching coding scheme. For example, coded information stream 242 is generated according to a rate-matching BCC coding scheme that defines a common base coding rate across the multiple coding rates supported by the BCC coding scheme, and further defines respective puncturing patterns for generating coded bit streams corresponding to different ones of the multiple coding rates, in an embodiment. In another embodiment and/or scenario, the coded information stream 242 is generated according to a non-rate-matching coding scheme that does not utilize a common base coding rate across multiple supported coding rates. For example, in an embodiment and/or scenario, the non-rate-matching coding scheme defines different information block lengths, for a set of codeword block lengths, to be used for generating coded information streams at different ones of multiple coding rates. In an embodiment and/or scenario, the coded information stream 242 is generated according to a non-codemating LDPC coding scheme that defines different parity matrices for generating coded information streams corresponding to different ones of the multiple coding rates.

In an embodiment, the first communication device supports both a rate-matching coding scheme, such as a BCC coding scheme, and a non-rate-matching coding scheme, such as an LDPC coding scheme. The non-rate-matching coding scheme, such as an LDPC coding scheme, is a higher-performance coding scheme as compared to a rate-matching coding scheme, such as a BCC coding scheme, in an embodiment. In an embodiment, the first communication device determines whether to generate the coded information stream 242 according to the rate-matching coding scheme or according to the non-rate-matching coding scheme based on various factors such as, for example, capabilities of the second communication device (e.g., whether the second communication device supports the rate-matching coding scheme and/or the non-rate-matching coding scheme, characteristics of the communication channel between the first communication and the second communication device, etc.

In an embodiment, the second communication device receives the PPDU 200 in the initial HARQ transmission, and attempts to decode the coded information stream 242 in the initial HARQ transmission. For example, the HARQ decoder 146/196 attempts to decode the coded information stream 242 in the initial HARQ transmission, in an embodiment. If the second communication device properly decodes the coded information stream 242, then the second communication device provides an acknowledgement to the first communication device to indicate to the first communication device that the second communication device was able to properly decode the coded information stream 242. For example, the second communication device sends an acknowledgement (ACK) frame or a block acknowledgement frame (Block ACK) to the first communication device to indicate that the second communication device was able to properly decode the coded information stream 242. On the other hand, if the second communication device is not able to properly decode the coded information stream 242, then the second communication device does not provide an acknowledgement to the first communication device, or provides a negative acknowledgement to the first communication device, in an embodiment. Further, the second communication device buffers the coded information stream 242 in a buffer of the second communication device so that "soft combining" can subsequently be used to properly decode the coded information stream 242, in an embodiment.

In an embodiment, after transmission of the initial PPDU 200 to the second communication device, the first communication device determines that second communication device was not able to properly decode the coded information stream 242 in the initial PPDU 200. For example, the first communication device does not receive an acknowledgement from the second communication device, or receives a negative acknowledgement from the second communication device, in an embodiment. When the first communication device determines that that second communication device was not able to properly decode the coded information stream 242 in the initial PPDU 200, the first communication device generates one or more additional PPDUs 200 for one or more HARQ retransmissions to the second communication device, in an embodiment. In an embodiment, when the PPDU 200 is generated for a HARQ retransmission, the PHY data portion 240 includes additional redundancy information that can be used at the second communication device for decoding the coded information stream 242 and/or includes one or more portions of the coded information stream 242 that can be used at the second communication device for decoding the coded information stream 242, in various embodiments.

In an embodiment in which the coded information stream 242 is generated according to the rate-matching coding scheme (e.g., BCC coding scheme) for the initial HARQ transmission, the data portion 240 in each of one or more IR HARQ retransmissions includes one or more coded bits that were punctured for the base coded bit stream to generate the coded information stream 242 for the initial HARQ transmission. Accordingly, in an embodiment in which the coded information stream 242 is generated according to the rate-matching coding scheme (e.g., BCC coding scheme) for the initial HARQ transmission, the data portion 240 in each of one or more IR HARQ retransmissions i) includes at least some punctured coded bits, i.e. coded bits that were excluded from the initial HARQ transmissions and ii) excludes all coded bits that were included in the initial HARQ transmission.

On the other hand, when the coded information stream 242 is generated according to the non-rate-matching coding scheme, because puncturing is not used to generate the coded information stream 242 at a desired coding rate, the first communication device is not able to provide, in a HARQ retransmission to the second communication device, additional redundancy information punctured from the coded information stream 242 in the initial HARQ transmission to incrementally provide additional information for decoding the coded information stream 242, in an embodiment. However, providing the entire coded information stream 242 in a HARQ retransmission is not efficient and may reduce overall throughput as compared to incremental redundancy implementations, in at least some situations. In an embodiment, to implement incremental redundancy when the coded information stream 242 is generated according to the non-rate-matching coding scheme, the data portion 240 in each of one or more IR HARQ retransmissions includes a selected portion of the coded information stream 242 generated for the initial HARQ transmission. For example, the data portion 240 in each of one or more IR HARQ retransmissions includes one of i) at least a portion of the information bits, but none of parity bits, of the coded information stream generated for the initial HARQ transmission, ii) none of the information bits, but at least a portion of the parity bits, of the coded information stream generated for the initial HARQ transmission, or iii) a portion of the information bits and a portion of the parity bits of the coded information stream generated for the initial HARQ transmission, in various embodiment. In an embodiment in which the coded information stream 242 is generated according to the non-rate-matching coding scheme (e.g., LDPC coding scheme) for the initial HARQ transmission, the data portion 240 in each of one or more IR HARQ retransmissions includes some, but not all, coded bits that were included in the initial HARQ transmission. In some embodiments, data portions 240 in different ones of the multiple IR HARQ retransmissions include different selected subsets of coded bits of the coded information stream 242 that were included in the initial HARQ transmission.

In an embodiment in which the data portion 240 of a PPDU 200 in each of one or more HARQ retransmissions includes a selected portion of the coded information stream 242 generated for the initial HARQ transmission, the first communication device provides an indication (e.g., in a subfield of the SIG field 244 of the PPDU 200) of the particular selected portion to the second communication device. In another embodiment, the second communication device is able to determine a priori the particular selected portion included in the data portion 240 of the PPDU 200.

In an embodiment, the second communication device receives the one or more additional PPDUs 200 in the one or more HARQ retransmissions from the first communication device. In an embodiment, the second communication device "soft combines" (e.g., the HARQ decoder 146/196 "soft combines") the information in the coded information stream 242 included in the initial HARQ transmission and the additional redundancy information in the one or more HARQ retransmissions to decode the information in the initial HARQ transmission, in an embodiment.

In an embodiment, when the first communication device utilizes a rate-matching coding scheme, such as a BCC coding scheme, to generate the coded information stream 242 for the initial HARQ transmission, the first communication device generates the data portion 240 in each of one or more IR HARQ retransmissions to i) include at least some punctured coded bits, i.e. coded bits that were excluded from the initial HARQ transmissions and ii) exclude all coded bits that were included in the initial HARQ transmission. On the other hand, when the first communication device utilizes a non-rate-matching coding scheme, such as an LDPC coding scheme, to generate the coded information stream 242 for the initial HARQ transmission, the first communication device generates the data portion 240 in each of one or more IR HARQ retransmissions to include a selected subset of coded bits as described herein, where the selected subset of coded bits includes some, but not all, coded bits that were included in the initial HARQ transmission, in an embodiment.

In an embodiment, because only a subset of the coded information stream 242 is included in the PPDU 200 generated for each of one or more HARQ retransmissions, providing incremental redundancy in each of the one or more HARQ retransmissions even when a non-rate-matching coding scheme is used to generate the coded information stream 242, the HARQ process is more efficient and has less impact on overall throughput as compared to implementations in which an entire coded information stream is included in each HARQ retransmission. Further, in some embodiments, including only a subset of the coded bits of the coded information stream 242 in each of one or more HARQ retransmissions allows the redundancy information to be provided with greater frequency diversity. For example, in some embodiments, the PPDU 200 is an orthogonal frequency division multiplexing (OFDM) data unit that comprises a plurality of OFDM symbols, each OFDM symbol having a plurality of OFDM tones. In some such embodiments, respective coded bits in the coded information stream 242 in an initial PPDU 200 are modulated onto first OFDM tones, and at least some of the corresponding respective coded bits selected for the one or more additional PPDUs 200 are modulated onto second OFDM tones different from the first OFDM tones. Modulating respective coded bits in the coded information stream 242 in the initial PPDU 200 and corresponding coded bits in an additional PPDU 200 onto different OFDM tones provides frequency diversity and further facilitates decoding of the coded information stream 242 at the second communication device, in at least some embodiments.

Figure 3:
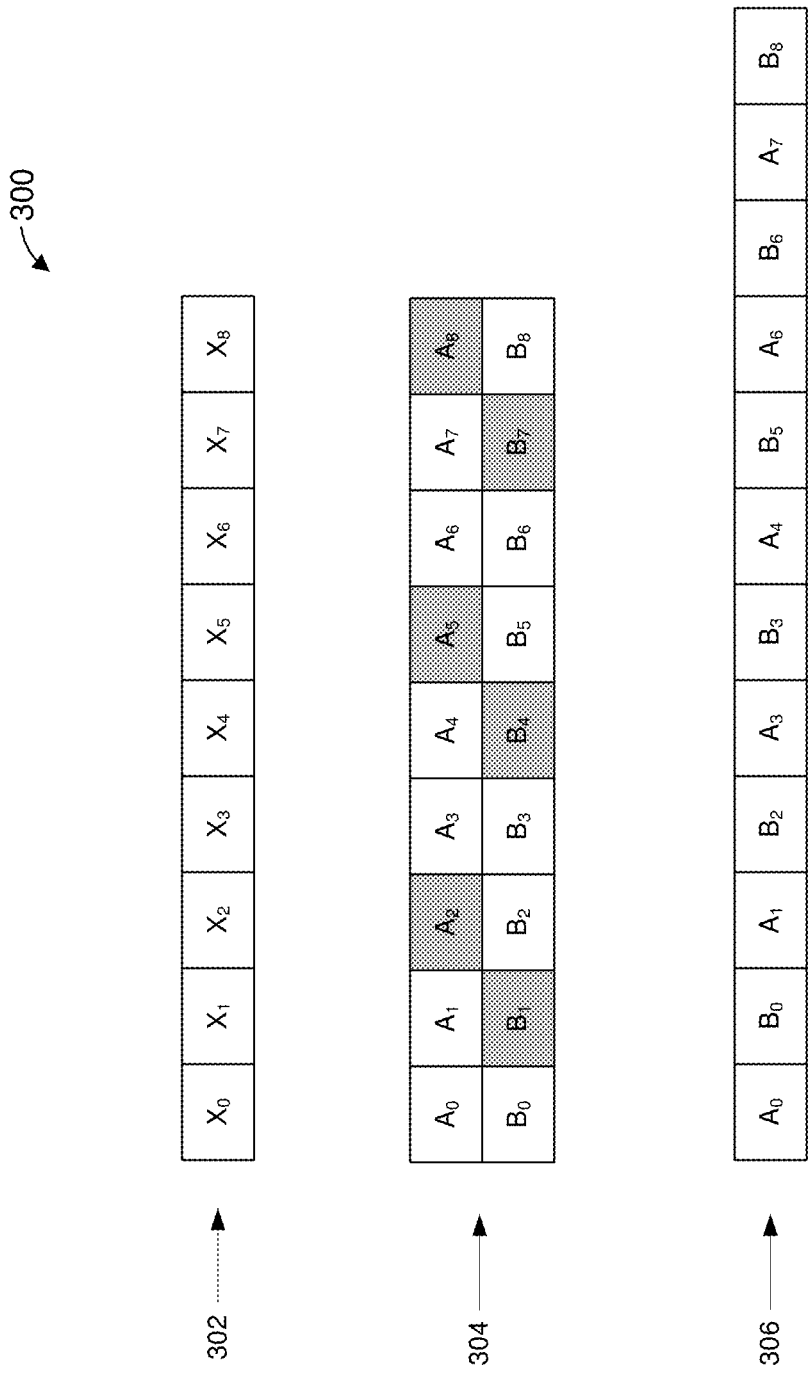
FIG. 3 is a diagram of a rate-matching coding scheme used to encode information for transmission in the PHY data unit of FIG. 2, according to an embodiment.

FIG. 3 is a diagram of a rate-matching coding scheme 300 used in generating the coded information stream 242 of the PPDU 200 of FIG. 2, according to an embodiment and/or scenario. The coding scheme 300 is a BCC coding scheme defined by a WLAN communication protocol (e.g., the IEEE 802.11ax protocol or another WLAN communication protocol), in an embodiment. The coding scheme 300 is used to encode an information bit stream at a coding rate of 3/4, in an embodiment. Similar coding schemes are utilized to encode information bit streams at other coding rates (e.g., 1/2, 2/3, 5/6, etc.) supported by the WLAN communication protocol, in an embodiment.

According to the coding scheme 300, blocks of information bits in an information bit stream are encoded using a convolution encoder. FIG. 3 illustrates encoding of a block of nine information bits 302, denoted in FIG. 3 as $X_0 \ldots X_8$, using the convolutional encoder. In an embodiment, the convolution encoder encodes the block of information bits into a first coded bit stream A, shown in FIG. 3 as bits $A_0 \ldots A_8$, and a second coded bit stream B, shown in FIG. 3 as $B_0 \ldots B_8$. The first coded bit stream A and the second coded bit stream B collectively correspond to a base-coded bit stream 304 encoded at a base coding rate of 1/2 and comprising eighteen coded bits. Six bit of the eighteen coded bits are "stolen" or punctured from the base-coded bit stream 304, in an embodiment. The coded bits that are punctured from the base-coded bit stream 304, according to an example puncturing scheme, are illustrated with shading in FIG. 3. Thus, bits $B_1, A_2, B_4, A_5, B_7$ and $A_8$ are punctured from the base-coded stream 304, in the illustrated embodiment. The remaining coded bits, that are not punctured from the base-coded bit stream 304, are concatenated to generate a punctured coded bit stream 306 at a coding rate of 2/3, in an embodiment. The punctured coded bit stream 306 is included in the coded information stream 242, in an embodiment. Additional blocks of the information bit stream are encoded according to the scheme 300 and are included in the coded information stream 242, in an embodiment.

In an embodiment, when rate-matching coding scheme such as the coding scheme 300 is used to generate the coded information stream 242, the one or more bits that are initially punctured from a base-coded bit stream corresponding to one or more coded blocks included in the initial coded information stream 242 are transmitted as incremental redundancy in one or more HARQ retransitions, in an embodiment. For example, a first HARQ retransmission includes bits $B_1, A_2$, a second HARQ retransmission (if needed) includes $B_4, A_5$, and a third HARQ retransmission (if needed) includes bits $B_7$ and $A_8$ that were omitted from each of one or more coding blocks in the initial coded information stream 242, in an example embodiment.

Figure 4:
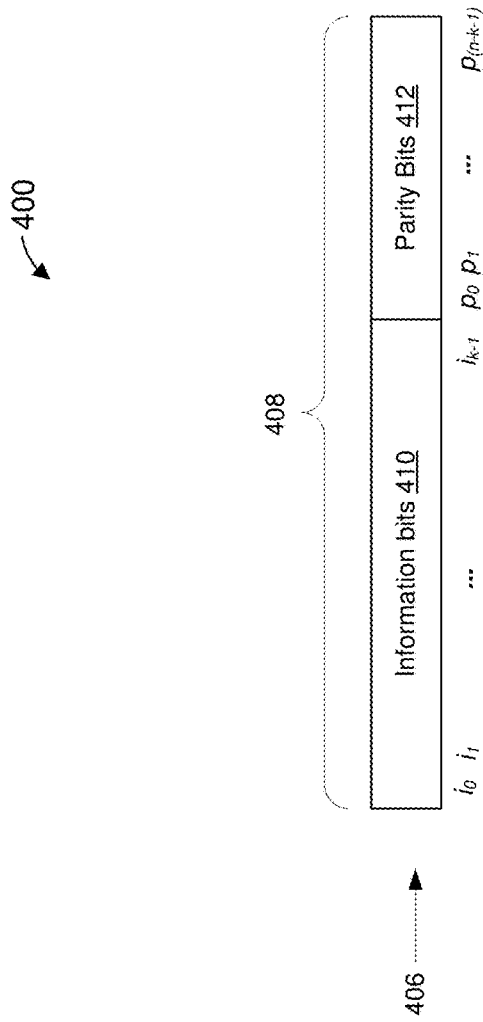
FIG. 4 is a diagram of a non-rate-matching coding scheme used to encode information for transmission in the PHY data unit of FIG. 2, according to an embodiment.

FIG. 4 is a diagram of a non-rate-matching coding scheme 400 used in generating the coded information stream 242 of the PPDU 200 of FIG. 2, according to another embodiment and/or scenario. The coding scheme 400 is an LDPC coding scheme defined by a WLAN communication protocol (e.g., the IEEE 802.11ax protocol or another WLAN communication protocol), in an embodiment. In another embodiment, the coding scheme 400 is another suitable non-rate-matching coding scheme.

According to the coding scheme 400, a block of information bits is encoded to generate a coded bit block 406 including a plurality of coded bits 408. In an embodiment, the block of information bits is encoded based on a codeword block length and a coding rate supported by the WLAN communication protocol. For example, the IEEE 802.11ax protocol defines three LDPC codeword block lengths—648 bits, 1296 bits and 1944 bits—and supports coding rates 1/2, 2/3, 3/4, and 5/6 for each of the codeword block lengths. To achieve the different supported coding rates, the IEEE 802.11ax protocol defines, for each codeword length, different information block lengths to be used for generating coded bit streams at different ones of supported coding rates, such that a ratio of an information block length to the codeword length defined for a particular coding rate corresponds to the particular coding rate. As just an example, for a coding rate of 1/2: the defined information block length for the codeword block length of 1944 is 972, the defined information block length for the codeword block length of 1296 is 648, etc. In other embodiments, other suitable codeword lengths and/or other suitable coding rates are utilized.

The coded bit block 406 includes a set of information bits 410 and a set of parity bits 412, in the illustrated embodiment. The set of information bits 410 includes the block of information bits being encoded, denoted in FIG. 4 as information bits $i_0, i_1 \ldots i_{(k-1)}$, in an embodiment. The parity bits 412 include a set of parity bits, denoted in FIG. 4 as $p_0, p_1, \ldots p_{(n-k-1)}$, generated based on the information bits 410, in an embodiment. In an embodiment, the parity bits $p_0, p_1, \ldots p_{(n-k-1)}$ are generated based on the information bits $i_0, i_1 \ldots i_{(k-1)}$ using a parity-check matrix that corresponds to a codeword block length and a coding rate being utilized to generate the coded bit block 406. In an embodiment, the total number of coded bits 408 in the coded bit block 406 corresponds to the codeword block length being utilized. In an embodiment, the ratio of the number of information bits 410 information portion 410 and the number of parity bits 412 in the coded bit block 406 corresponds to the coding rate being utilized.

In an embodiment, when a non-rate-matching coding scheme such as the coding scheme 400 is used to generate the coded information stream 242, a HARQ retransmission corresponding to the coded information stream 242 includes one or more selected subsets of the coded bits 408 in each of one or more coded blocks 406 included in the coded information stream 242. In an embodiment, the HARQ transmission information selector 144 or the HARQ transmission information selector 194 selects a subset the coded bits 408 for HARQ retransmission. The selected subset of the coded bits 408 includes some, but not all, of the coded bits 408, in an embodiment. For example, in an embodiment, all or a portion of the information bits 410 (e.g., every information bit, every other information bit, every second information bit, etc., or any other suitable portion of consecutive or non-consecutive information bits among the information bits 410) are selected for HARQ retransmission, and none of the parity bits 412 are selected for the HARQ retransmission, in an embodiment. As another example, all or a portion of the parity bits 412 (e.g., every parity bit, every other parity bit, every second parity bit, etc., or any other suitable portion of consecutive or non-consecutive parity bits among the parity bits 412) are selected for HARQ retransmission, and none of the information bits 410 are selected for the HARQ retransmission, in an embodiment. As yet another example, a portion of consecutive or non-consecutive information bits among the information bits 410 and a portion of consecutive or non-consecutive parity bits among the parity bits 412 are selected for HARQ retransmission. In other embodiments, other suitable subsets of the coded bits 408 are selected.

In an embodiment, the subset of the coded bits 408 is selected based on a particular initial coding rate of the coded block 406. For example, a relatively lower number of information bits 410 and/or a relatively greater number of parity bits 412 is selected for a HARQ retransmission when the initial coding rate is relatively low (e.g., 1/2) as compared to a relatively greater number of information bits 410 and/or a relatively lower number of parity bits 412 selected for a HARQ retransmission when the initial coding rate is relatively high (e.g., 5/6). For example, in an embodiment, the subset of the coded bits 408 is selected such that a ratio between the number of selected information bits 410 and the number of selected parity bits 412 is proportional to the initial coding rate. As another example, the subset of the coded bits 408 is selected such that a ratio between the number of selected information bits 410 and the number of selected parity bits 412 corresponds to the initial coding rate, in an embodiment. Thus, for example, if the initial coding rate used to generate the coded bits 408 is 1/2, the subset of the coded bits 408 is selected such that the ratio between the number of selected information bits 410 and the number of selected parity bits 412 is 1:1, in an embodiment. On the other hand, if the initial coding rate used to generate the coded bits 408 is 5/6, the subset of the coded bits 408 is selected such that the ratio between the number of selected information bits 410 and the number of selected parity bits 412 is 5:1, in an embodiment.

Additionally or alternatively, the subset of the coded bits 408 is selected based on conditions of a communication channel in which HARQ retransmission is to occur, in an embodiment. For example, a relatively greater number of the information bits 410 and/or parity bits 412 is selected if the communication channel in which HARQ retransmission is to occur has a relatively lower signal to noise ratio (SNR), a relatively greater packet error rate (PER), etc. characteristic of poor channel conditions as compared to a relatively lower number of the information bits 410 and/or parity bits 412 selected if the communication channel in which HARQ retransmission is to occur has a relatively higher SNR, a relatively lower PER, etc. characteristic of good channel conditions, in an embodiment.

In some embodiments in which multiple HARQ transmissions (e.g., an initial HARQ transmission and one or more HARQ retransmissions) retransmissions are performed, different subsets of the coded bits 408 are selected for different ones of the multiple HARQ transmissions. For example, selection of the subsets of the coded bits 408 alternates between selecting only information bits (e.g., all or a portion of the information bits 410) and selecting only parity bits (e.g., all or a portion of the parity bits 412) for consecutive ones of the multiple HARQ transmissions, in an embodiment. As another example, alternating different subsets of the information bits 410 and the parity bits 412 are selected for consecutive ones of the multiple HARQ transmissions, in an embodiment. As yet another example, alternating different subsets of the information bits 410 and all of the parity bits 412 are selected for consecutive ones of the multiple HARQ transmissions, in an embodiment. In other embodiments, other suitable alternating patterns are utilized.

Figure 5:
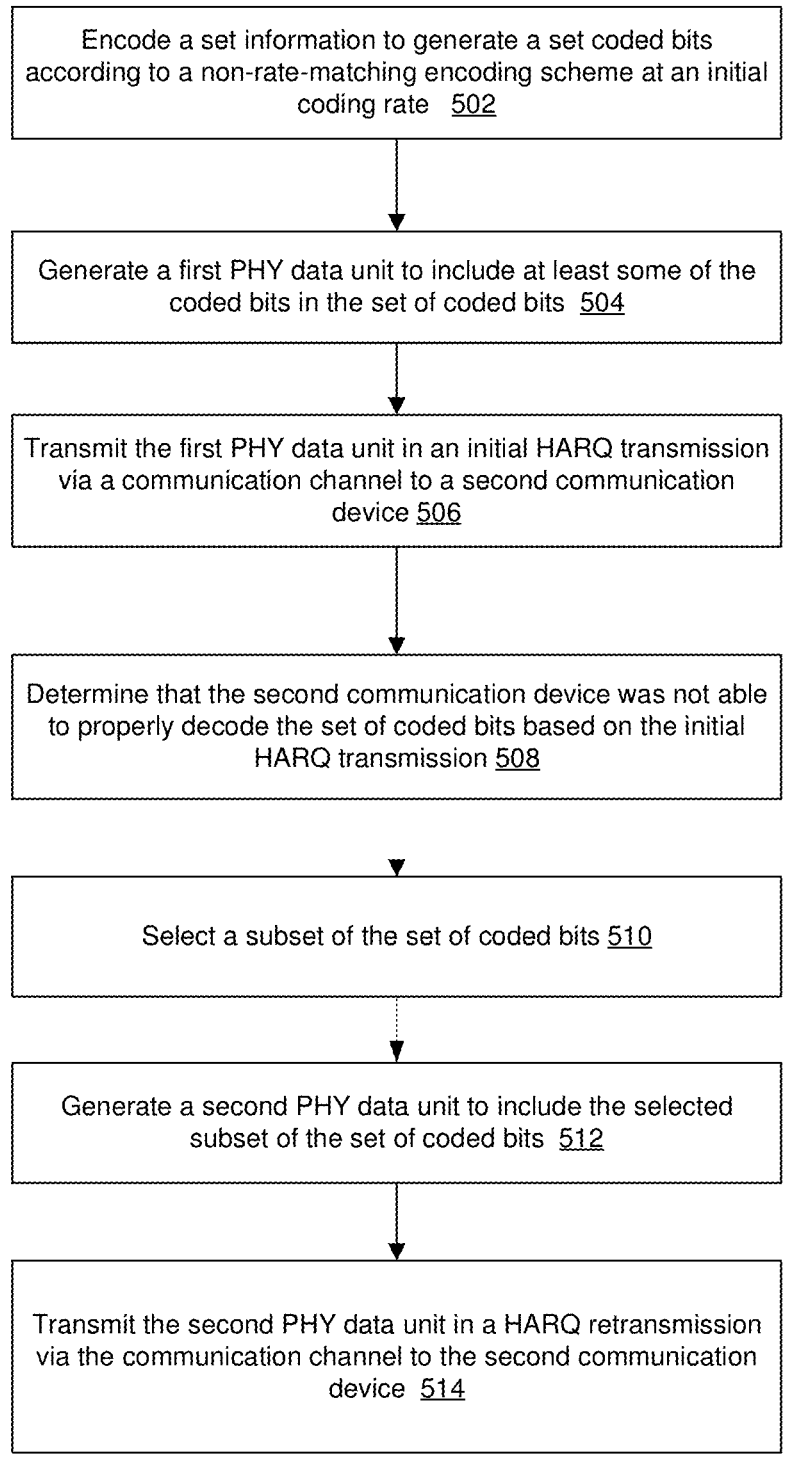
FIG. 5 is a flow diagram of a method for communicating according to the HARQ process in the WLAN of FIG. 1, according to another embodiment.

FIG. 5 is a flow diagram of an example method 500 for communication in a WLAN according to a HARQ process, according to an embodiment. In some embodiments, the network interface 122/162 is configured to implement the method 500. In some embodiments, the PHY processor 130/170 is configured to implement at least a portion of the method 500.

At block 502, a first communication device encodes a set information bits to generate a set of coded bits. The first communication device encodes the set of information bits according to a non-rate-matching coding scheme at an initial coding rate, in an embodiment. In an embodiment, the first communication device encodes the set of information bits by determining a set of parity bits based on the set of information bits, and generating the set of coded bits to include the set of information bits and the set of parity bits generated based on the set of information bits. For example, the first communication device generates the set of coded bits by appending the set of parity bits to the set of information bits. The non-rate-matching coding scheme defining different information block lengths, for a set of codeword block lengths, to be used for generating coded bit streams at different ones of multiple coding rates, in an embodiment. In an embodiment, the first communication device encodes the set of information bits according to an LDPC coding scheme defined by a WLAN communication protocol. In an embodiment, the first communication device encodes the set of information bits according to the coding scheme 400 of FIG. 4. In other embodiments, other suitable non-code-matching coding schemes are utilized.

At block 504, the first communication device generates a first physical layer (PHY) data unit to include at least some of the coded bits in the set of coded bits. In an embodiment, the first communication device generates the PPDU 200 of FIG. 2 to include the at least some of the coded bits in the PHY data portion 240. In another embodiment, another suitable PHY data unit format is utilized.

At block 506, the first communication device transmits the first PHY data unit in an initial HARQ transmission via a communication channel to the second communication device.

At block 508, the first communication device determines that the second communication device was not able to properly decode the set of coded bits based on the initial HARQ transmission. For example, the first communication device determines that the second communication device was not able to properly decode the set of coded bits because the first communication device does not receive an acknowledgement from the second communication device, in an embodiment. In another embodiment, the first communication device determines that the second communication device was not able to properly decode the set of coded bits because the first communication device receives a negative acknowledgement from the second communication device.

At block 510, in response to determining at block 508 that the second communication device was not able to properly decode the set of coded bits based on the initial HARQ transmission, the first communication device selects a subset of the set of coded bits generated at block 502. In an embodiment, the subset of the set of coded bits selected at block 510 includes some, but not all, coded bits that were included in the initial HARQ transmission. For example, the first communication device selects at least a portion of the information bits and does not select any parity bits of the set of parity bits generated at block 502 so that the subset of coded bits i) includes the selected at least the portion of the information bits and ii) excludes the parity bits, in an embodiment. As another example, the first communication device selects at least a portion of the parity bits generated at block 502 and does not select any of the information bits so that the subset of coded bits i) includes the selected at least the portion of the parity bits and ii) excludes the information bits, in another embodiment. As yet another example, the first communication device selects a portion of the information bits and a portion of the parity bits of the set of parity bits generated at block 502 so that the subset of coded bits i) the selected portion of the information bits and ii) the selected portion of parity bits, in an embodiment. In an embodiment, the first communication device selects the subset of coded bits based at least in part on the initial coding rate of the non-code-matching coding scheme used to encode the set of information bits at block 502. For example, the first communication device selects a portion of information bits and a portion of parity bits such that the ratio between the number of information bits and the number of parity bits in the selected subset of coded bits corresponds to the initial coding rate, in an embodiment. In an embodiment, the first communication device selects the subset of coded bits additionally or alternatively based at least in part on characteristics of the communication channel (e.g., a measure SNR in the communication channel, a PER in the communication channel, etc.) from the first communication device to the second communication device. For example, the first communication device selects a relatively greater number of the information bits and/or parity bits if the communication channel has a relatively lower SNR, a relatively greater PER, etc., and selects a relatively lower number of the information bits and/or parity bits if the communication channel has a relatively higher SNR, a relatively lower PER, etc., in an embodiment.

At block 512, the first communication device generates a second PHY data unit to include the subset of the set of coded bits selected at block 510. In an embodiment, the first communication device generates the second PHY data unit to i) include the subset of the set of coded bits selected at block 510 and ii) exclude coded bits, of the set of coded bits, not selected at block 510. In an embodiment, the first communication device generates the PHY data unit to further include (e.g., in a signal field of a preamble of the data unit) information indicating which coded bits are included in the subset of coded bits selected by the first communication device. For example, the information indicating which coded bits are included in the subset of coded bits selected by the first communication device includes one or more of i) whether some or all of the information bits were selected ii) whether some or all of the parity bits were selected, iii) a ratio of the selected information bits to the selected parity bits, etc., in various embodiments. In an embodiment, the first communication device generates the PPDU 200 of FIG. 2 to include i) the information indicating which coded bits are included in the subset of coded bits selected by the first communication device in the SIG field 244 of the PPDU 200 and ii) the selected subset of the coded bits in the PHY data portion 240 of the PPDU 200. In another embodiment, another suitable PHY data unit format is utilized.

At block 514, the first communication device transmits the second PHY data unit in a HARQ retransmission via the communication channel to the second communication device. The subset of the coded bits included in the second PHY data unit provides incremental redundancy for decoding the set of coded bits at the second communication device, in an embodiment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions are stored in a computer readable memory such as a random access memory (RAM), a read only memory (ROM), a flash memory, etc. The software or firmware instructions include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating a method for communicating according to a hybrid automatic repeat request (HARQ) process in a wireless local area network (WLAN), the method comprising:

encoding, at a first communication device according to a non-rate-matching coding scheme at a particular coding rate, a set information bits to generate a set of coded bits, the non-rate-matching coding scheme defining different information block lengths, for a set of codeword block lengths, to be used for generating coded bit streams at different ones of multiple coding rates;

generating, at the first communication device, a first physical layer (PHY) data unit to include all the coded bits in the set of coded bits;

transmitting, by the first communication device, the first PHY data unit in an initial hybrid automatic repeat request (HARQ) transmission via a communication channel to a second communication device;

determining, at the first communication device, that the second communication device was not able to properly decode the set of coded bits based on the initial HARQ transmission;

in response to determining that the second communication device was not able to properly decode the set of coded bits based on the initial HARQ transmission, selecting, at the first communication device, a first subset of the set of coded bits, the first subset of the set of coded bits including some, but not all, coded bits that were included in the initial HARQ transmission, and generating, at the first communication device, a second PHY data unit to i) include the coded bits selected for the first subset of the set of coded bits and ii) exclude coded bits, of the set of coded bits, not selected for the first subset of the set of coded bits; and transmitting, by the first communication device, the second PHY data unit in a HARQ retransmission via the communication channel to the second communication device to enhance the reliability of decoding the set of coded bits at the second communication device, wherein using frequency diversity for the partially repeated coded bits transmitted in HARQ retransmission and combining soft information of partially repeated coded bits at the second communication device facilitate the decoding, and wherein the transmission of the second PHY data unit does not include the excluded coded bits and does not change the particular coding rate of the set information bits received in the first PHY data unit coded as the set of coded bits.

2. The method of claim 1, wherein selecting the first subset of the set of coded bits comprises selecting the first subset based at least in part on the particular coding rate of the non-code-matching coding scheme.

3. The method of claim 1, wherein selecting the first subset of the set of coded bits comprises selecting the first subset based at least in part on one or more of i) a signal to noise ratio (SNR) corresponding to the communication channel from the first communication device to the second communication device and ii) a packet error rate (PER) corresponding to the communication channel from the first communication device to the second communication device.

4. The method of claim 1, wherein encoding the set of information bits according to the non-rate-matching coding scheme comprises encoding the set of information bits according to a low density parity check (LDPC) coding scheme.

5. The method of claim 1, wherein encoding the set of information bits according to the non-rate-matching coding scheme to generate the set of coded bits comprises:
determining a set of parity bits based on the set of information bits; and
generating the set of coded bits to include the set of information bits and the set of parity bits.

6. The method of claim 5, wherein selecting the first subset of the set of coded bits comprises selecting the first subset to one of:
i) a) include at least a portion of consecutive or non-consecutive information bits among the set of information bits and b) exclude the set of parity bits, or
ii) a) include at least a portion consecutive or non-consecutive parity bits among the set of parity bits and b) exclude the set of information bits.

7. The method of claim 5, wherein selecting the first subset of the set of coded bits comprises selecting the first subset to include i) a portion of consecutive or non-consecutive information bits among the set of information bits and ii) a portion of consecutive or non-consecutive parity bits among the set of parity bits.

8. The method of claim 7, wherein selecting the first subset of bits includes selecting i) a number of information bits, from among the set of information bits, to be included in the first subset of the set of coded bits and ii) a number of parity bits, from among the set of parity bits, to be included in the first subset of coded bits, wherein a ratio between the selected number of information bits and the selected number of parity bits is proportional to the particular coding rate, wherein the number of information bits is less than a total number of information bits in the set of information bits, and the number of parity bits is less than a total number of parity bits in the set of parity bits.

9. The method of claim 1, further comprising:
determining, at the first communication device, that the second communication device was not able to properly decode the set of coded bits based on the a combination of the initial HARQ transmission and the HARQ retransmission,
in response to determining that the second communication device was not able to properly decode the set of coded bits based on the a combination of the initial HARQ transmission and the HARQ retransmission,
selecting, at the first communication device, a second subset of the set of coded bits, the second subset of the set of coded bits being different from the first subset of coded bits,
generating, at the first communication device, a third PHY data unit to include the selected second subset of the set of coded bits; and
transmitting, by the first communication device, the third PHY data unit in a HARQ retransmission to the second communication device to enhance the reliability of decoding the set of coded bits at the second communication device.

10. The method of claim 9, wherein:
selecting the first subset of the set of coded bits comprises selecting the first subset to i) include at least a portion of the information bits and ii) exclude the set of parity bits, and
selecting the second subset of the set of coded bits comprises selecting the second subset to i) include at least a portion of the parity bits and ii) exclude the set of information bits.

11. A wireless communication device, comprising:
a network interface device associated with a first communication device, wherein the network interface device is implemented on one or more integrated circuit (IC) devices, and wherein the one or more IC devices are configured to:
encode, according to a non-rate-matching coding scheme at a particular coding rate, a set information bits to generate a set of coded bits,
generate a first physical layer (PHY) data unit to include all the coded bits in the set of coded bits,
transmit the first PHY data unit in an initial hybrid automatic repeat request (HARQ) transmission via a communication channel to a second communication device,
determine that the second communication device was not able to properly decode the set of coded bits based on the initial HARQ transmission,
in response to determining that the second communication device was not able to properly decode the set of coded bits based on the initial HARQ transmission,
select a first subset of the set of coded bits, the first subset of the set of coded bits including some, but not all, coded bits that were included in the initial HARQ transmission, and
generate a second PHY data unit to i) include the coded bits selected for the first subset of the set of coded bits and ii) exclude coded bits, of the set of coded bits, not selected for the first subset of the set of coded bits, and transmit the second PHY data unit in a HARQ retransmission via the communication channel to the second communication device to enhance the reliability of decoding the set of coded bits at the second communication device, wherein using frequency diversity for the partially repeated coded bits transmitted in HARQ retransmission, and combining soft information of partially repeated coded bits at the second communication device facilitate the decoding; and wherein the transmission of the second PHY data unit does not include the excluded coded bits and does not change the particular coding rate of the set information bits received in the first PHY data unit coded as the set of coded bits.

12. The first communication device of claim 11, wherein the one or more IC devices are configured to select the first subset of the set of coded bits based at least in part on the particular coding rate of the non-code-matching coding scheme.

13. The first communication device of claim 11, wherein the one or more IC devices are configured to select the first subset based at least in part on one or more of i) a signal to noise ratio (SNR) corresponding to the communication channel from the first communication device to the second communication device and ii) a packet error rate (PER) corresponding to the communication channel from the first communication device to the second communication device.

14. The first communication device of claim 11, wherein the one or more IC devices are configured to encode the set of information bits according to a low density parity check (LDPC) coding scheme.

15. The first communication device of claim 11, wherein the one or more IC devices are configured to encoding the set of information bits according to the non-rate-matching coding scheme to generate the set of coded bits at least by:
  determining a set of parity bits based on the set of information bits; and
  generating the set of coded bits to include the set of information bits and the set of parity bits.

16. The first communication device of claim 15, wherein the one or more IC devices are configured to select the first subset to one of:
  i) a) include at least a portion of consecutive or non-consecutive information bits among the set of information bits and b) exclude the set of parity bits, or
  ii) a) include at least a portion consecutive or non-consecutive parity bits among the set of parity bits and b) exclude the set of information bits.

17. The first communication device of claim 15, wherein the one or more IC devices are configured to select the first subset to include i) a portion of consecutive or non-consecutive information bits among the set of information bits and ii) a portion of consecutive or non-consecutive parity bits among the set of parity bits.

18. The first communication device of claim 17, wherein the one or more IC devices are configured to select i) a number of information bits, from among the set of information bits, to be included in the first subset of the set of coded bits and ii) a number of parity bits, from among the set of parity bits, to be included in the first subset of coded bits, wherein a ratio between the selected number of information bits and the selected number of parity bits is proportional to the particular coding rate, wherein the number of information bits is less than a total number of information bits in the set of information bits, and the number of parity bits is less than a total number of parity bits in the set of parity bits.

19. The first communication device of claim 11, wherein the one or more IC devices are further configured to:
  determine that the second communication device was not able to properly decode the set of coded bits based on the a combination of the initial HARQ transmission and the HARQ retransmission,
  in response to determining that the second communication device was not able to properly decode the set of coded bits based on the a combination of the initial HARQ transmission and the HARQ retransmission,
  select a second subset of the set of coded bits, the second subset of the set of coded bits being different from the first subset of coded bits,
  generate a third PHY data unit to include the selected second subset of the set of coded bits; and
  transmit the third PHY data unit in a HARQ retransmission to the second communication device to enhance the reliability of decoding the set of coded bits at the second communication device.

20. The first communication device of claim 19, wherein the one or more IC devices are configured to:
  select the first subset to i) include at least a portion of the information bits and ii) exclude the set of parity bits, and
  select the second subset to i) include at least a portion of the parity bits and ii) exclude the set of information bits.

21. The method of claim 2, wherein the selection is based on (i) selecting all of the information bits if the coding rate is a first coding rate and selecting less than all of the information bits if the coding rate is a second coding rate or (ii) selecting less than all parity bits of the coded bits if the coding rate is the first coding rate and selecting all of the parity bits if the coding rate is a second coding rate, wherein the first coding rate is higher than the second coding rate.

22. The wireless communication device of claim 12, wherein the one or more IC devices are further configured to (i) select all of the information bits if the coding rate is a first coding rate and select less than all of the information bits if the coding rate is a second coding rate or (ii) select less than all parity bits of the coded bits if the coding rate is the first coding rate and select all of the parity bits if the coding rate is a second coding rate, wherein the first coding rate is higher than the second coding rate.

23. The method of claim 1, wherein selecting the first subset of the set of coded bits comprises selecting the first subset based on a packet error rate (PER) corresponding to the communication channel from the first communication device to the second communication device.

24. The wireless communication device of claim 11, wherein the one or more IC devices are configured to select the first subset based on a packet error rate (PER) corresponding to the communication channel from the first communication device to the second communication device.

25. The method of claim 1, wherein the HARQ retransmission does not send any information bits or parity bits which were not included in the set of coded bits of the initial HARQ transmission.

26. The wireless communication device of claim 11, wherein the HARQ retransmission does not send any information bits or parity bits which were not included in the set of coded bits of the initial HARQ transmission.

* * * * *